United States Patent [19]
André, Sr.

[11] Patent Number: 5,614,075
[45] Date of Patent: *Mar. 25, 1997

[54] METHOD OF INCREMENTAL OBJECT FABRICATION

[76] Inventor: Larry E. André, Sr., 812 Saddlebrook Dr. South, Bedford, Tex. 76021

[ * ] Notice: The term of this patent shall not extend beyond the expiration date of Pat. No. 5,435,902.

[21] Appl. No.: 476,269

[22] Filed: Jun. 7, 1995

Related U.S. Application Data

[63] Continuation of Ser. No. 131,205, Oct. 1, 1993, Pat. No. 5,435,902.

[51] Int. Cl.$^6$ ........................................... C25D 1/00
[52] U.S. Cl. ................................ 205/67; 264/401
[58] Field of Search ..................... 205/67, 70, 75, 205/527.1, DIG. 12; 264/22; 29/527.1, 527.2, 527.4

[56] References Cited

U.S. PATENT DOCUMENTS

| | | | |
|---|---|---|---|
| 4,080,267 | 3/1978 | Castellani | 430/5 |
| 4,961,154 | 10/1990 | Pomerantz et al. | 364/522 |
| 5,109,589 | 5/1992 | Cramer | 29/527.4 |
| 5,141,680 | 8/1992 | Almquist et al. | 264/22 |
| 5,174,943 | 12/1992 | Hull | 264/308 |
| 5,190,637 | 3/1993 | Guckel | 205/118 |
| 5,192,559 | 3/1993 | Hull et al. | 425/89 |
| 5,234,571 | 8/1993 | Noeker | 205/70 |
| 5,263,130 | 11/1993 | Pomerantz et al. | 295/118 |
| 5,287,435 | 2/1994 | Cohen et al. | 295/118 |
| 5,386,500 | 1/1995 | Pomerantz et al. | 395/119 |
| 5,435,902 | 7/1995 | Andre | 205/67 |

OTHER PUBLICATIONS

P.E. Jacobs, Ph.D., "Rapid Prototyping & Manufacturing," Fundamentals of Sterolithography (S.M.E. 1992) pp. 397–423 U.S.A.

Primary Examiner—Arun S. Phasge
Assistant Examiner—Brendan Mee
Attorney, Agent, or Firm—Mark D. Perdue; Robert A. Felsman

[57] ABSTRACT

An incremental object or part fabrication method includes the step of determining the dimensional boundaries of the part, the dimensional boundaries including x, y, and z dimensions. A reference surface is provided and a first incremental layer of mold material is formed on the reference surface. The first incremental layer of mold material is selectively interrupted to define at least one dimensional boundary of the part. A first incremental layer of part material is formed upon at least the reference surface, wherein a second reference surface is defined by the first incremental layers of mold and part material. The steps of forming incremental layers of mold and part material are repeated until the object is fully fabricated and all dimensional boundaries are defined.

14 Claims, 5 Drawing Sheets

METHOD OF INCREMENTAL OBJECT FABRICATION

This application is a continuation, of application Ser. No. 08/131,205, filed Oct. 1, 1993, now U.S. Pat. No. 5,435,902.

BACKGROUND OF THE INVENTION

1. Field of the Invention

The present invention relates generally to methods for fabricating three-dimensional objects. More specifically, the present invention relates to a method for fabricating three-dimensional objects in incremental layers employing data generated in a CAD/CAM system, the method steps being controlled by a central computer or distributed data processing system.

2. Background Information

Recently, there have been great strides in technology relating to rapid prototyping and manufacturing ("RP&M"), particularly to the integration of CAD/CAM ("Computer Aided Design/Computer Aided Manufacturing") systems into the object fabrication process beyond simple object design and drafting. A goal of this technology is to obtain a final or near-final three-dimensional object or part from CAD/CAM data with as little human intervention as possible. A comprehensive discussion of the state of the RP&M art is found in *Rapid Prototyping and Manufacturing*, P. Jacobs et al. (Society of Manufacturing Engineers, 1992).

One technology that has received a great deal of attention in this regard is known as "stereolithography," which literally means "three-dimensional printing." In stereolithography, dimensional data generated in a CAD/CAM system is employed to "print" an object in a fully or near-fully automated fabrication system. The stereolithography method and apparatus is disclosed in a number of patents assigned to 3-D Systems Inc. of Valencia, Calif. The 3-D Systems method and apparatus employs CAD/CAM data to control a beam of radiant energy. The beam of radiant energy is directed into a bath of radiantly cured liquid polymer to selectively cure the polymer and thus build an object through accumulation of incremental layers of cured polymer. Thus, the three-dimensional printing is accomplished by selective curing of substantially two-dimensional layers of polymeric material.

Another method and apparatus for RP&M is disclosed in a series of patents assigned to the University of Texas. In this method, a CAD/CAM system is employed to control a laser, which selectively sinters particles of material, typically a plastic powder, to form the object through accumulation of incremental layers of sintered material.

Other known RP&M systems adhesively laminate together layers of polymeric or paper tape. Each layer is trimmed by a laser or other means to the cross-sectional dimensions of the object, wherein accumulation of layers of tape forms the fully fabricated object.

A drawback to all of these methods is that the ultimate part, while in some respects satisfactory for model building, generally lacks the material properties desired of a satisfactory prototype part. For example, the parts resulting from the cured liquid polymer processes tend to be brittle. The parts resulting from the laser sintering process suffer from the porosity and strength problems typical of sintered parts.

One attempted solution to this problem is disclosed in a series of patents assigned to the University of Southern California. In this process, liquid metal is deposited in droplet form and the droplet stream is manipulated to form the object through accumulation and solidification of the metal droplets. This process results in a satisfactory metallic prototype part, but is extremely complex, even in the context of this complex technological area, is extremely expensive, and the control systems are not sufficiently developed to accurately and repeatably produce prototype parts with satisfactory dimensional tolerances.

A need exists, therefore, for a method of fabricating objects, employing a CAD/CAM system, that is capable of fabricating an object with satisfactory material properties and dimensional tolerances, and with the ability to fabricate complex and intricate shapes.

SUMMARY OF THE INVENTION

It is a general object of the present invention to provide an improved method of three-dimensional object or part fabrication. This and other objects of the present invention are achieved by determining the dimensional boundaries of the part, the dimensional boundaries including x, y, and z dimensions. A reference surface is provided and a first incremental layer of mold material is formed on the reference surface. The first incremental layer of mold material is selectively interrupted to define at least one dimensional boundary of the part. A first incremental layer of part material is formed upon at least the reference surface, wherein a second reference surface is defined by the first incremental layers of mold and part material. The steps of forming incremental layers of mold and part material are repeated until the part is fully fabricated and all dimensional boundaries are defined.

According to a preferred embodiment of the present invention, the incremental layers of mold material are formed of a UV-cured liquid polymer by a stereolithography apparatus, the incremental layers of part material are electroformed of nickel or other metal, and the method is implemented and controlled in a computer system.

Other objects, features, and advantages of the present invention will become apparent to those having skill in the art with reference to the detailed description, which follows.

DESCRIPTION OF THE PREFERRED EMBODIMENT

Figure 1:
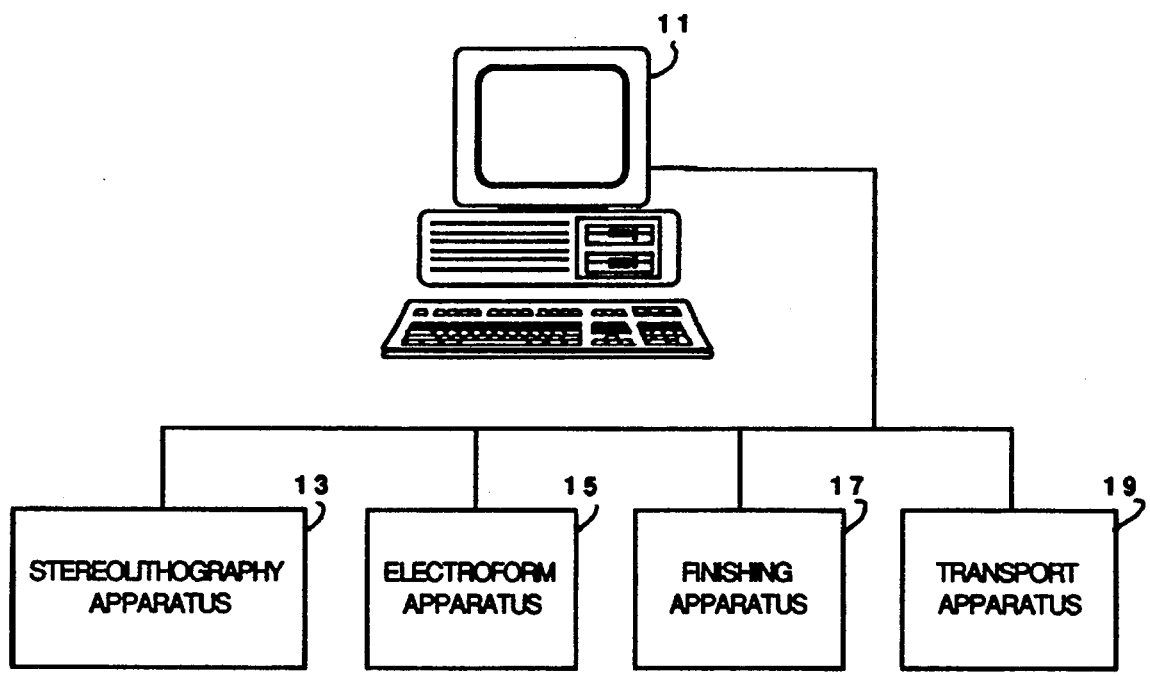
FIG. 1 is a block diagram schematically representing functional components of the apparatus employed in the method of the present invention.

Referring now to the Figures, and particularly to FIG. 1, functional components of an apparatus for use in implementing the method according to the present invention are illustrated in block diagram form. The functional components include a computer system 11. Computer system 11 is depicted as a desk top personal computer, but could include a workstation, mainframe, distributed data processing system, or the like, so long as the system is adapted for centralized control and implementation of other functional components of the apparatus.

These functional components include a stereolithography apparatus 13, an electroform apparatus 15, a finishing apparatus 17, and a transport apparatus 19. All are coupled to computer 11 for control of each respective functional component 13, 17, 19 by computer 11 in implementation of the method according to the present invention. The operation of and interrelation between the functional components will become apparent as the method of the present invention is described in greater detail below.

Figure 2:
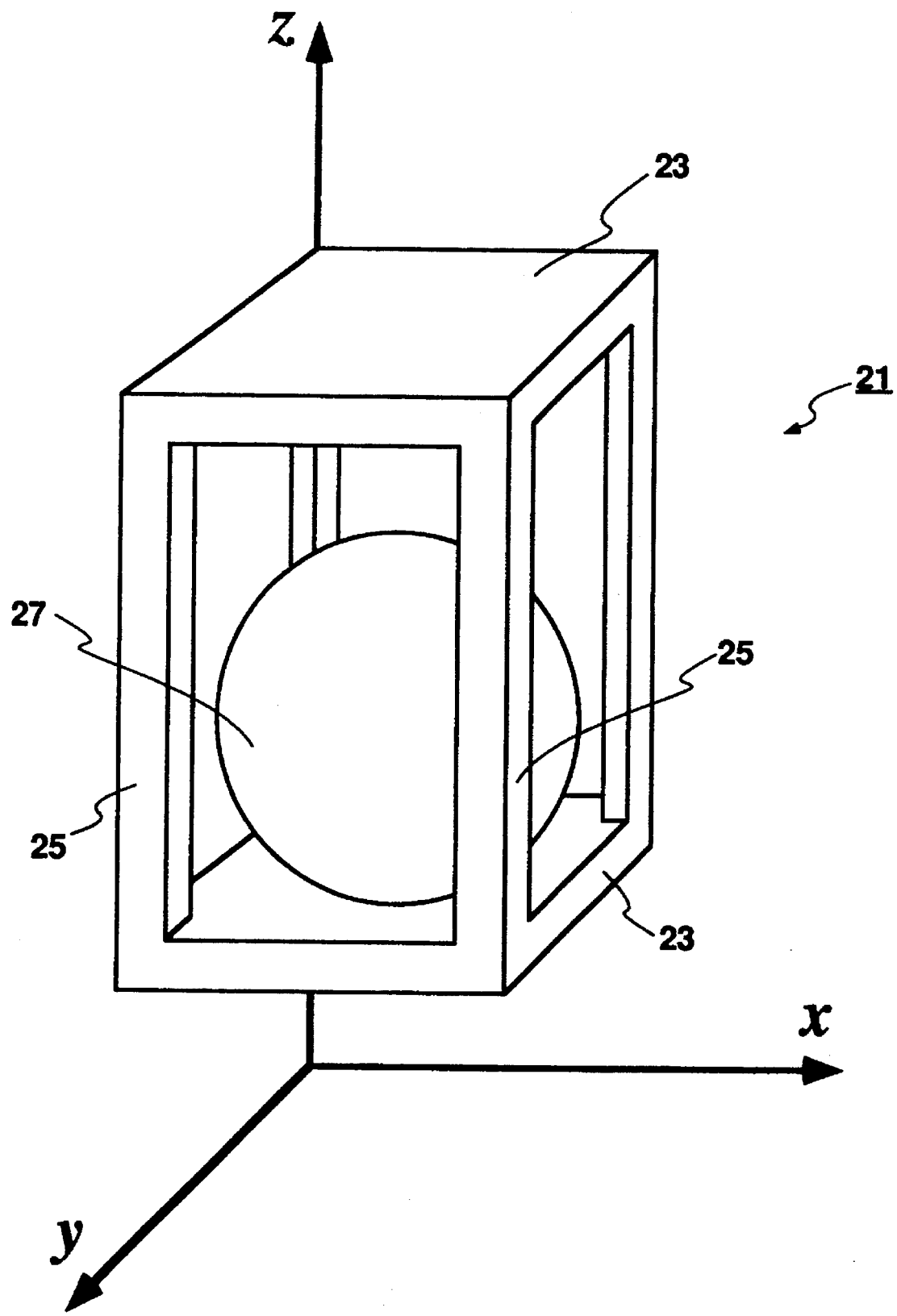
FIG. 2 is a perspective view of an exemplary object or part manufactured according to the method of the present invention.

FIG. 2 is a perspective view of a three-dimensional object or part 21 that is fabricated according to the method of the present invention. Part 21 comprises a pair of end pieces 23, which are connected by four columns 25. A spherical ball 27 is contained within the space defined by end pieces 23 and connecting columns 25. Part 21 is integrally formed, preferably of a metallic material. The intricate, part-within-a-part, nature of part 21 illustrates the intricacy of parts that can be formed with the method according to the present invention and the versatility of the method of the present invention. As with any three-dimensional object, part 21 has x, y, and z dimensional boundaries.

Before part 21 is fabricated, these dimensional boundaries can be obtained from data contained in a conventional CAD/CAM system with three-dimensional solid modeling capability, such as Pro/ENGINEER™, a CAD/CAM system sold by Parametric Technology Corporation of Waltham, Mass. Given a three-dimensional, solid model description of part 21 in a CAD/CAM system, the x, y, and z dimensional boundaries of the part can be determined appropriately for the method of the present invention in a conventional manipulation of the data. As is conventional in stereolithography, the x and y dimensional boundaries of part 21 are determined at each of a selected number of points along the z axis. The incremental distance dz between each of the selected points on the z axis may be selected by the operator and in large part determines the intricacy of the part 21 that can be fabricated, and the quality of dimensional tolerance and surface finish that can be obtained. For example, to obtain a relatively smooth surface on a rounded object such as spherical member 27, increment dz should be selected to be relatively small, on the order of 0.004 inch or less. For generally straight-sided objects, the increment dz is less critical.

With reference to FIGS. 1–3E, the method according to the present invention is described. After determining and generating the dimensional boundaries of part 21 in the CAD/CAM system of computer 11, the dimensional data is downloaded from computer 11 to stereolithography apparatus 13. The downloaded data is manipulated and processed to a form appropriate for use by stereolithography apparatus 13.

Figure 3A:
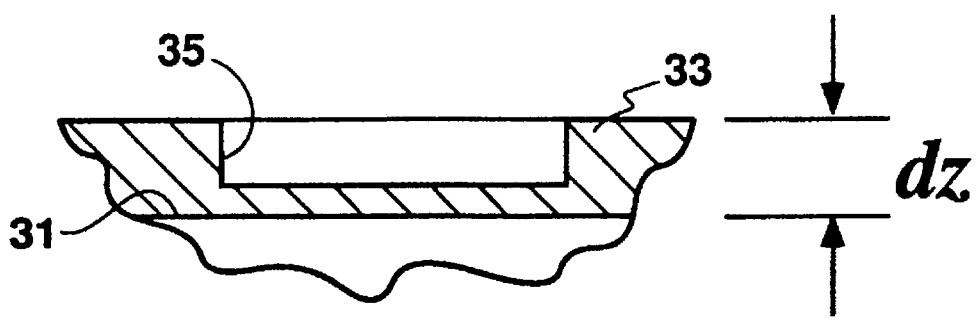
FIGS. 3A–3E are fragmentary section views illustrating the fabrication of a part according to the method of the present invention.

Stereolithography apparatus 13 is provided with a generally flat reference surface or build datum 31, as illustrated in FIG. 3A. Stereolithography apparatus 13 is employed to form a first incremental layer 33 of mold material of thickness dz, determined previously along with other dimensional boundaries of part 21. Incremental layer of mold material 33 is selectively interrupted, wherein one or more interruptions 35 in layer 33 define various x and y dimensional boundaries of part 21.

According to the preferred embodiment of the present invention, stereolithography apparatus 13 is the 3D-Systems model SLA-250, manufactured and sold by 3-D Systems Inc. of Valencia, Calif. This apparatus employs the previously mentioned CAD/CAM data to selectively form incremental layers of UV-curable liquid polymer. Specifically, the SLA-250 employs an argon laser to at least partially solidify or cure the UV-curable polymer on a build datum (31 in FIG. 3A–3E), which is moved up and down in a bath of the UV-curable polymer. The SLA-250, because of the nature of the liquid polymer employed therein, requires an additional post-cure step in an ultraviolet oven to fully cure incremental layer 33. Photopolymer resins used in stereolithography apparatus 13 include both acrylate and epoxy formulations. A preferred photopolymer resin is Cibatool™ XB 5170 epoxy resin, which is available from Ciba-Geigy A. G., Fribourg, Switzerland, but other resins are available and improved resins are becoming available. Thus, prior to subsequent processing, reference surface or build datum 31 and incremental layer 33 must be removed from stereolithography apparatus 13 by transport apparatus 19 and subjected to the post-cure process.

Transport apparatus 19 could be one of a variety of robotic or automated devices that is computer controllable to move a pallet consisting of at least build datum 31 and incremental layers of partially formed part 21 between the various functional components 13, 15, 17, of the apparatus for implementation of the method according to the present invention.

Figure 3B:
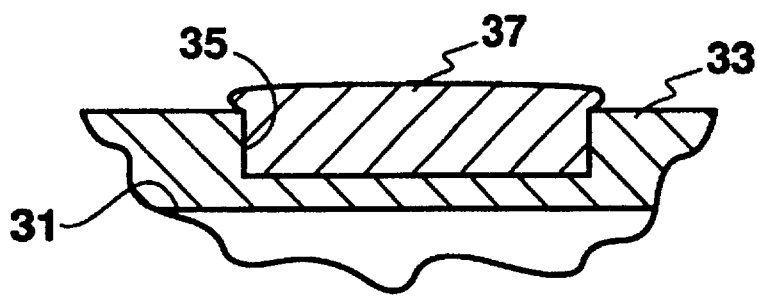

FIG. 3B depicts, in fragmentary section view, the result of the next step of the method according to the present invention, in which a first incremental layer of part material 37 is formed on at least interruption 35 in layer of mold material 33. Again, this step necessitates that at least build datum surface 31 and incremental layer of mold material 33 be moved from stereolithography apparatus 13 to electroform apparatus 15.

According to a preferred embodiment of the present invention, incremental layer of part material 37 is formed by an electroforming process. Electroforming is a conventional process that is similar to electroplating in that it occurs in an electrolytic solution containing ions of the metal to be deposited and is driven by an anode and cathode arrangement in which the cathode, or negatively charged object in the solution, bears a negative image of the object to be formed. An electrical charge on the cathode attracts the metallic ions, which are deposited on the cathode and accumulate over time to form a layer of metal having a positive relief of the contours of the cathode. Because electroforming occurs on a molecular level, the resulting layer of metal has excellent material properties. Typically in electroform operations, the cathode is known as a mandrel. In the present invention, incremental layers of mold material 33 serve as the cathode or mandrel, and electroformed incremental layers of part material 37 adopt the configuration of incremental layers of mold material 33, including at least one interruption 35.

According to a preferred embodiment of the present invention, incremental layers of part material 37 are formed of nickel. Nickel is preferred because it is readily adapted for electroform procedures and generally has satisfactory material properties for most prototype part applications. Alternative materials include copper and iron and may be more appropriate for certain applications.

Because the preferred first incremental layer of mold material 33, which serves as the mandrel, is formed of polymeric material, the mold material must be metalized for layer 33 to perform its role as a cathode in electroform apparatus 15. This step is conventional in electroforming and permits the appropriate surfaces of mold material 33 to become electrically charged, thus facilitating the formation of layer of part material 37 on the appropriate surfaces of layer of mold material 33 and interruption 35.

Metalizing can be accomplished in a number of ways, including spraying a metallic compound or solution on the area to be metalized. According to a preferred embodiment of the present invention all of the uppermost surfaces of incremental layer of mold material 33 are metalized, including the sidewalls defined by interruption 35. Metalizing is removed from the uppermost surface of layer 33 prior to electroforming in a process similar to the finishing step described below to avoid unnecessary formation of part material thereon. Alternatively, metalizing is applied selectively only to the sidewalls defined by interruption 35 because it is redundant to metalize the metallic surface provided by layer of part material 37. More background information on electroforming technology can be found in *Electroplating Engineering Handbook*, A. Kenneth Graham, (Van Nostrand Reinhold, 3d. Ed. 1971) and *Practical Electroplating Handbook*, N. V. Parthasaradhy (Prentice Hall, 1989).

After incremental layer of part material 37 is formed over and on first layer of mold material 33, its uppermost surface is machined, ground, or otherwise rendered dimensionally flat and parallel to build datum 31 in finishing apparatus 17. The finishing step is important because it provides a new reference surface 41 on which subsequent layers of part and mold material can be formed. For dimensional accuracy, second reference surface 41 must be flat and parallel to build datum 31.

Finishing apparatus 17 is one of any number of conventional numerically controlled grinders, mills, or other machine tools. Again, this finishing step necessitates that a pallet consisting of at least build datum 31 and layers of mold and part material 33, 37 be moved by transport apparatus 19 between electroform apparatus 15 and finishing apparatus 17.

Figure 3C:
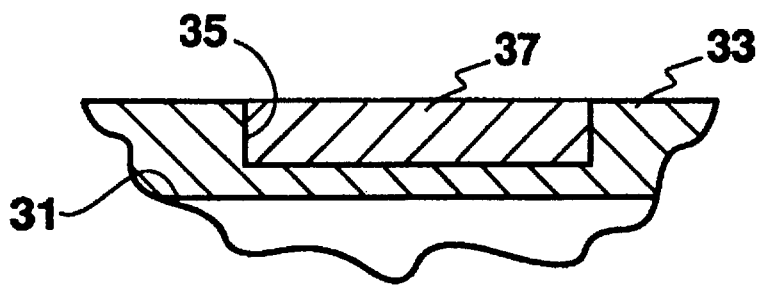
Figure 3D:
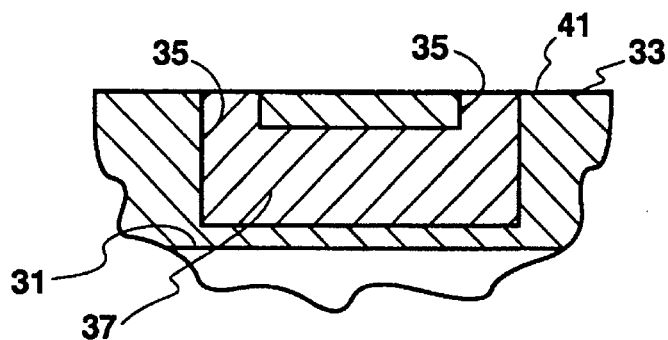
Figure 3E:
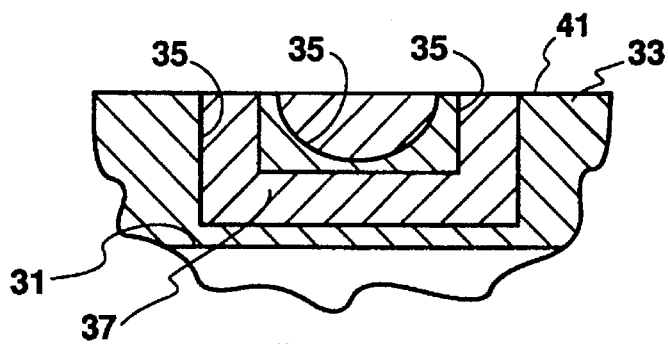
Figure 4:
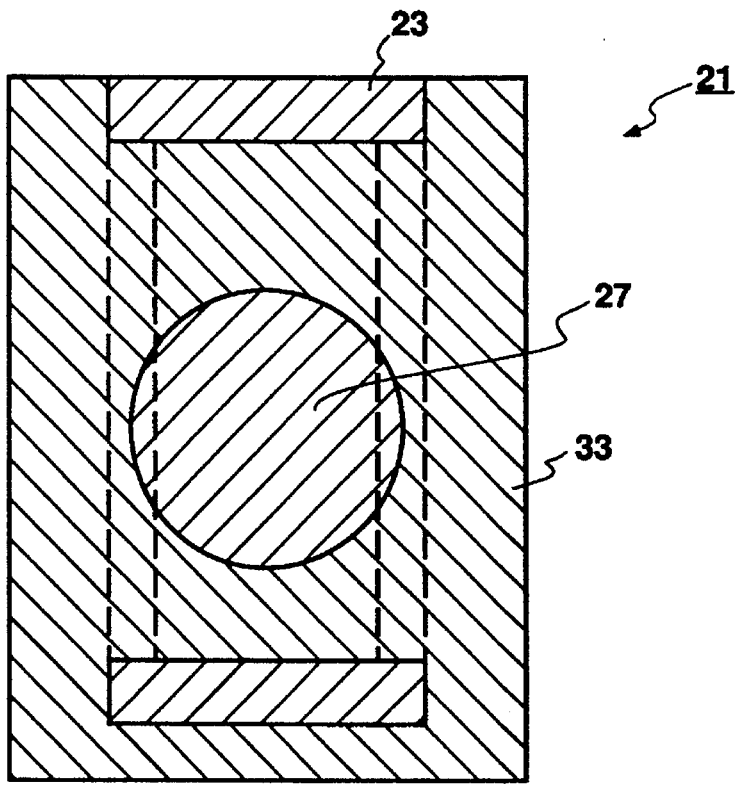
FIG. 4 is a longitudinal cross section of the part of FIG. 2, prior to the step of removing the incremental layers of mold material from the fully fabricated part.

The steps represented by FIGS. 3A–3C are repeated, substantially identically as disclosed before, until all dimensional boundaries of part 21, including the x, y, and z dimensions, are fully defined, and object 21 is fully fabricated, as illustrated in FIG. 4. FIGS. 3D and 3E illustrate the result of subsequent formation of layers of part and mold material. FIG. 3D illustrates the formation of the columns of the part, and FIG. 3E illustrates formation of a portion of the spherical ball of the part.

In the method steps subsequent the formation of the first incremental layers of mold and part material 33, 37, the metallic and electrically conductive layer of part material 37 will form a portion of second build datum 41 and largely eliminates the necessity of the metalizing step of the electroforming process. However, metalizing may remain advantageous for certain part features, particularly at the sidewalls defined by interruption 35.

FIG. 4 illustrates fully formed part 21, including spherical member 27 and end pieces 23, encased in mold material 33 produced by the method according to the present invention. Thus, as a final step, mold material 33 must be removed to permit access to and full function of part 21. Depending upon the polymer employed in stereolithography apparatus 13, a number of methods of removal may be employed. For example, if mold material 33 is a polymer that degrades upon exposure to heat, mold material 33 may simply be melted away. Other polymeric materials may necessitate acid-bath removal, bead or sand blasting, grinding, or other similar material removal operations. When mold material 33 is removed, a fully formed and functional nickel part 21, substantially as illustrated in FIG. 2, remains.

Figure 5:
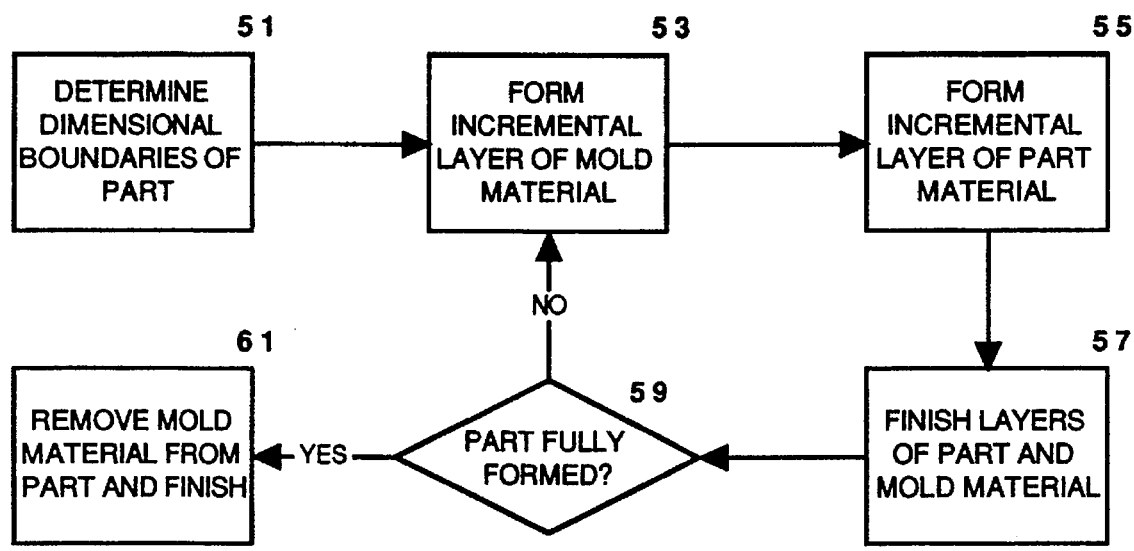
FIG. 5 is a flow chart schematically representing the steps of the method according to the present invention.

In summary, FIG. 5 is a flow chart depicting the principal operative steps of the method according to the present invention. Block 51 represents the step of determining the dimensional boundaries of the object employing CAD/CAM system in computer 11. A first incremental layer of mold material is formed in stereolithography apparatus 13, as represented by block 53. Next, a first incremental layer of part material is formed in electroform apparatus 15, as denoted by block 55. Then, the layers of part and mold material are finished to form a new reference surface in finishing apparatus 17, as represented by block 57. The steps represented by block 53–57 are repeated until all dimensional boundaries of the part are defined, as indicated by block 59. Finally, the incremental layers of mold material encasing the part are removed to reveal a fully fabricated part having a surface finish, dimensional tolerances, and material properties that are generally improved over the prior art, as represented by block 61.

The principal advantage of the present invention is that it provides an improved method of rapid prototyping and manufacturing of metallic parts. Because of the iterative and repetitive nature of the method according to the present invention, it is particularly adapted to automated computer control. Additionally, because individual functional components of the apparatus for implementing the method are presently subject to computer control, the method according to the present inventions is particularly adapted to be centrally controlled by a single computer or a distributed data processing system.

The invention has been described with reference to a preferred embodiment thereof. It will be apparent to those skilled in the art that the present invention is susceptible to variation and modification without departing from the scope of the invention.

I claim:

1. A method of fabricating a metallic, three-dimensional object or part comprising the steps of:

determining dimensional boundaries of the part within a computer CAD/CAM system, the dimensional boundaries including x, y, and z dimensions;

providing a reference surface;

a) forming a first incremental layer of polymeric mold material on the reference surface, the incremental layer being selectively interrupted to define at least one dimensional boundary of the part;

b) forming a first incremental layer of metallic part material upon at least the interruption in the first incremental layer of mold material, wherein a second reference surface is defined by the first incremental layer of mold material and the first layer of part material;

c) forming a second incremental layer of polymeric mold material upon the second reference surface, the second incremental layer being selectively interrupted to define another at least one dimension of the part;

d) forming a second incremental layer of metallic part material upon at least the second reference surface;

repeating steps a) through d) until all dimensional boundaries are defined and the part is fully fabricated, wherein each of the steps (a) through (d) is implemented and controlled by a central controller.

2. The method according to claim 1 wherein the incremental layers of mold material are formed of UV-cured liquid polymer by stereolithography.

3. The method according to claim 1 wherein the incremental layers of part material are electroformed of metallic material.

4. The method according to claim 1 further including the step of finishing the incremental layers of mold and part material to form the reference surfaces.

5. A method of fabricating a metallic, three-dimensional object or part comprising the steps of:

determining dimensional boundaries of the part within a computer CAD/CAM system, the dimensional boundaries including x, y, and z dimensions;

providing a build datum surface;

a) forming an incremental mold layer of polymeric material on the build datum surface by selectively solidifying mold material to define at least x and y dimensions of the part;

b) forming an incremental part layer of metallic material upon the mold layer, wherein the part layer assumes the at least x and y dimensions of the part;

c) finishing the incremental mold and part layers to define a reference surface; and repeating steps a) through c) until all of the x, y, and z dimensions of the part are defined and the part is fully fabricated.

6. The method according to claim 5 wherein the incremental layers of mold material are formed of UV-cured liquid polymer by stereolithography.

7. The method according to claim 5 wherein the incremental layers of part material are electroformed of metallic material.

8. The method according to claim 5 wherein the steps of forming the incremental layers of mold and part material are controlled by a computer.

9. A method of fabricating a metallic, three-dimensional object or part comprising the steps of:

employing a computer CAD/CAM system to determine dimensional boundaries of the part, the dimensional boundaries including at least x, y, and z dimensions;

a) employing a stereolithography apparatus to form a first incremental layer of UV-cured polymer mold material upon a build datum surface, the first incremental layer of mold material being selectively interrupted to define at least one of the dimensional boundaries of the part;

b) metalizing at least the interruption in the incremental layer of mold material and electroforming a first incremental layer of metallic material upon at least the interruption in the first incremental layer of mold material, wherein the first incremental layer of metallic material conforms to the at least one dimensional boundary of the part;

c) finishing the first incremental layers of mold and metallic materials to define a new reference surface parallel to the build datum surface; and repeating steps a)–c) until the all dimensional boundaries of the part are defined and the part is fully fabricated.

10. The method according to claim 9 wherein the at least one dimensional boundary of the part includes the x and y dimensions.

11. The method according to claim 9 wherein the stereolithography apparatus is controlled by a computer.

12. The method according to claim 9 wherein the electroforming step is controlled by a computer.

13. The method according to claim 9 wherein the number and thicknesses of the incremental layers of mold and part material are defined by the z dimension of the part.

14. The method according to claim 9 further including the step of removing the incremental layers of polymeric mold material from the fully fabricated part, wherein a metallic fully fabricated part results.

* * * * *